2,993,018
PRODUCTION OF COLOURED FILAMENTS, THREADS AND THE LIKE FROM VISCOSE

Felix Steinlin, Pont du Leu, Pas de Calais, France, assignor to Les Files de Calais, Pont du Leu, Pas de Calais, France, a French company
No Drawing. Filed Jan. 6, 1959, Ser. No. 785,130
Claims priority, application Great Britain Jan. 28, 1958
3 Claims. (Cl. 260—17.4)

This invention relates to the production of coloured filaments, fibres, staple fibres, threads and the like, hereinafter referred to generally as "threads." The invention is particularly concerned with the type of process in which viscose containing a colouring matter is extruded into a coagulating bath; such threads are frequently referred to as "spun-dyed" threads.

It is known to produce coloured viscose filaments by blending a colouring matter with a small quantity of viscose to form a suspension of the colouring matter and then injecting the suspension into the main body of viscose during the spinning operation. The process is described in United States patent specification No. 1,823,769. An improved method of adding a colouring matter to viscose by the injection technique is described in United States patent specification No. 2,783,158 in which the pigment is dispersed in an aqueous stable viscous solution of a fibre-forming material which is compatible with viscose, and the mixture obtained is injected into a main stream of viscose just before extrusion. Examples of suitable fibre-forming materials described in the said United States Patent No. 2,783,158 are casein and sodium carboxy methyl cellulose.

I have now found that the dissolved material of the injected viscous solution need not be fibre-forming and that certain advantages can be obtained by using non-fibre-forming solutions as the carrier for the pigment.

This invention accordingly provides a stable medium for dispersing pigments for injection into viscose in the production of spun-dyed threads of regenerated cellulose.

According to the present invention a process for the production of spun-dyed regenerated cellulose threads from viscose comprises dispersing a pigment in a stable viscous aqueous solution of a water-soluble high molecular weight addition polymer compatible with viscose, injecting the mixture so obtained into a main stream of viscose and extruding the viscose containing the dispersed pigment into a coagulating bath to form a thread.

A water-soluble addition polymer suitable for use according to this invention may be made by polymerising one or more ethylenically unsaturated compounds and if the polymer is not water-soluble rendering it water-soluble by chemical reaction; for example methyl methacrylate may be polymerised to form polymethyl methacrylate, which may then be hydrolysed to polymethacrylic acid from which polyammonium methacrylate may be obtained by reaction with ammonia; polyammonium methacrylate is a particularly satisfactory addition polymer for use according to this invention. Other examples of suitable addition polymers are other water-soluble salts of poly-methacrylic acid such as poly sodium methacrylate or poly potassium methacrylate, salts such as the sodium, potassium and ammonium salts of polyacrylic acid.

The term "viscous solution" as used in this specification means a solution sufficiently viscous to hold the colouring matter in suspension for long periods and also sufficiently viscous to be capable of being spun on viscose spinning machinery and in particular to be capable of being metered by gear wheel pumps, which are used for metering the solution in the injection apparatus. As is well known in the art, solutions of fibre-forming materials capable of being metered by gear wheel pumps may be prepared over a wide range of viscosities depending on a number of variables including temperature, spinning pressure and the type of gear wheel pump used. For example while viscose is frequently metered and spun at a viscosity of about 70 poises at 20° C. viscoses have been successfully metered and spun with a viscosity as low as 13 poises or as high as 140 poises. Tests may therefore be necessary to determine a suitable viscosity for the stable solution under the conditions of injection and spinning employed.

The aqueous solution of the addition polymer preferably has a viscosity substantially the same as that of the viscose to which it is to be added.

A pigment to be useful according to this invention must be inert to the chemicals used in all stages of viscose manufacture and processing of the viscose into threads of regenerated cellulose. Any of the known pigments may be used for example mineral pigments such as burnt chromium oxide, carbon black and titanium dioxide, acid- and alkali-stable vat dyed in the unreduced states and azoic dyestuffs.

The polymer solution containing the dispersed pigment is preferably metered by a metering pump such as a gear pump and injected into the viscose stream shortly before the extrusion of the viscose.

The viscosity of a polymer solution is proportional to the molecular weight of the polymer so that high molecular weight polymers are preferred as providing in aqueous solution viscous liquids of low polymer content. The solutions, as already indicated, should be of sufficient viscosity to maintain an added pigment in suspension over a lengthy period, enabling the mixture to be made in large batches for storing and to provide an unchanging pigmenting mixture for long production runs.

The aqueous solutions of polymers according to this invention are usually homogeneous, clear, colourless and devoid of gels and undissolved matter, so that filtration of viscoses containing the pigment dispersion is easy, or unnecessary, and the instrumental control of pigment concentration of the pigment-loaded polymer solution is facilitated. The control of pigment concentration makes possible a better reproducibility of colour in the threads produced from the pigmented viscose, even with interrupted production. The improvement in reproducibility of delicate colours is most marked, as in threads coloured grey, or beige, or red.

The invention is illustrated by the following examples; percentages are by weight.

*Example 1*

31 litres of water and 60 kilograms of a 15 percent solution of polyammonium methacrylate sold under the trade name Calasec M.A.H., were mixed in a paddle mixer and to this mixture were added, with stirring, 350 kilograms of an aqueous 15 percent carbon black paste. Stirring was continued for 4 hours until a homogeneous suspension of the pigment was obtained.

The mixture was filtered through layers of textile fabric in a filter press to remove large undispersed particles of carbon black and was degassed by storing under partial vacuum for from 6 to 8 hours. The resultant mixture was then stored, ready for injection.

The ball fall viscosity of the mixture was approximately 15 seconds; the mixture was stable on standing and the pigment did not settle out on standing for one month.

The mixture was injected into the main viscose supply line leading to a spinning jet at an injection ratio of parts by volume of 1/40 and the viscose was extruded according to the standard technique into an acid coagulating bath to form a thread. The resultant thread was processed in the normal way to give a black viscose rayon thread of first quality.

*Example 2*

179 litres of water and 85.8 kilograms of Calasec M.A.H. were mixed in a paddle mixer. To the mixture was added with stirring 14.65 kilograms of a 15 percent aqueous carbon black paste and 1.015 kilograms of Viscofil Violet 4RL aqueous paste which had an approximate pigment content of 20 percent. After stirring the mixture was degassed and stored. The viscosity of the mixture measured by ball fall was 40 poises. The mixture was injected into a main stream of viscose at a ratio of parts by volume of 1/150, and the viscose was extruded through a jet into an acid coagulating bath according to standard technique. Normal processing of the extruded viscose thread resulted in a grey thread with a blue tinge and with uniform colouration.

The polyammonium methacrylate used in the above examples may be replaced by other water-soluble polymers such as polyammonium acrylate giving suspensions of similar viscosity to those quoted.

What I claim is:

1. A process for the production of colored regenerated cellulose threads by the viscose process which comprises dispersing a pigment in a aqueous solution containing in solution, as the sole dispersing agent for the pigment, a water-soluble salt of a polymer chosen from the group consisting of the sodium, potassium and ammonium salts of polyacrylic acid and of polymethacrylic acid, injecting the pigment dispersion so produced into a main stream of spinning viscose and immediately thereafter extruding the mixture of spinning viscose and dispersed pigment directly into a coagulating bath.

2. The process claimed in claim 1 wherein the salt is a polyammonium methacrylate.

3. A process as claimed in claim 2 wherein the viscosity of the aqueous polyammonium methacrylate solution is substantially the same as that of the viscose to which it is to be added.

References Cited in the file of this patent

UNITED STATES PATENTS

| | | |
|---|---|---|
| 2,233,344 | Helm et al. | Feb. 25, 1941 |
| 2,234,734 | Kline | Mar. 11, 1941 |
| 2,337,398 | Marsh et al. | Dec. 21, 1943 |
| 2,650,168 | Van Dijk et al. | Aug. 25, 1953 |
| 2,706,689 | Agulhon | Apr. 19, 1955 |
| 2,783,158 | Entwistle et al. | Feb. 26, 1957 |
| 2,875,077 | McClellan | Feb. 24, 1959 |